United States Patent
Cho et al.

(10) Patent No.: US 11,290,014 B2
(45) Date of Patent: Mar. 29, 2022

(54) BOOST DC-DC CONVERTER USING DSM, DUTY CONTROLLER FOR BOOST DC-DC CONVERTER, AND METHOD FOR CONFIGURING DUTY CONTROLLER

(71) Applicant: Electronics and Telecommunications Research Institute, Daejeon (KR)

(72) Inventors: Young Kyun Cho, Daejeon (KR); Tae Joong Kim, Daejeon (KR); Kwang Chun Lee, Daejeon (KR); Jung Nam Lee, Daejeon (KR); Jae Ho Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 23 days.

(21) Appl. No.: 16/939,567

(22) Filed: Jul. 27, 2020

(65) Prior Publication Data
US 2021/0036613 A1 Feb. 4, 2021

(30) Foreign Application Priority Data
Aug. 2, 2019 (KR) .................. 10-2019-0094332

(51) Int. Cl.
*H02M 3/158* (2006.01)
*H02M 3/156* (2006.01)
(Continued)

(52) U.S. Cl.
CPC .......... *H02M 3/158* (2013.01); *H02M 1/083* (2013.01); *H02M 1/38* (2013.01); *H02M 3/157* (2013.01); *H02M 1/0009* (2021.05)

(58) Field of Classification Search
CPC .... H02M 3/156; H02M 3/158; H02M 1/0025; H02M 1/0058; H02M 1/08; H02M 1/088; H02M 1/38
See application file for complete search history.

(56) References Cited

U.S. PATENT DOCUMENTS 6,295,238 B1 * 9/2001 Tanizaki ............... G11C 11/406
365/201
6,653,960 B2 * 11/2003 Mitamura ............. H02M 3/156
323/282

(Continued)

FOREIGN PATENT DOCUMENTS

KR 101526666 B1 6/2015
KR 1020160001070 A 1/2016
(Continued)

OTHER PUBLICATIONS

Chi-Hsiang Huang et al., Compensator-Free Mixed-Ripple Adaptive On-Time Controlled Boost Converter, Feb. 2018, pp. 596-604, IEEE Journal of Solid-State Circuits, vol. 53 No. 2, Institute of Electrical and Electronics Engineers.

(Continued)

*Primary Examiner* — Sisay G Tiku
(74) *Attorney, Agent, or Firm* — William Park & Associates Ltd.

(57) ABSTRACT

A boost direct current-to-direct current (DC-DC) converter using a delta-sigma modulator (DSM), the boost DC-DC converter may comprise a boost driving circuit outputting an output voltage to output terminals by boosting an input voltage, a resistance distribution circuit outputting a feedback voltage by distributing the output voltage of the boost driving circuit, a compensator outputting a compensated feedback voltage by compensating for the feedback voltage outputted by the resistance distribution circuit based on a reference voltage, a delta-sigma modulator outputting a digital signal by modulating the compensated feedback voltage and a duty controller outputting a duty control signal for controlling a switching duty of the boost driving circuit by receiving the output of the delta-sigma modulator.

19 Claims, 7 Drawing Sheets

(51) Int. Cl.
  *H02M 1/08* (2006.01)
  *H02M 1/088* (2006.01)
  *H02M 1/00* (2006.01)
  *H02M 3/157* (2006.01)
  *H02M 1/38* (2007.01)

(56) References Cited

U.S. PATENT DOCUMENTS

| | | | | |
|---|---|---|---|---|
| 7,554,308 | B2* | 6/2009 | Roh | H02M 3/157 |
| | | | | 323/282 |
| 7,773,016 | B2* | 8/2010 | Miao | H02M 3/157 |
| | | | | 341/142 |
| 8,164,316 | B2 | 4/2012 | Kobori et al. | |
| 8,283,900 | B2 | 10/2012 | Jang et al. | |
| 10,135,339 | B1 | 11/2018 | Rosenbaum et al. | |
| 10,222,814 | B1 | 3/2019 | Chakraborty et al. | |
| 10,236,773 | B2* | 3/2019 | Miyamae | H02M 3/157 |
| 10,374,514 | B2 | 8/2019 | Chakkirala et al. | |
| 10,418,898 | B2* | 9/2019 | Cho | H02M 1/08 |
| 10,491,105 | B1* | 11/2019 | Cho | H02M 3/1588 |
| 10,505,448 | B2* | 12/2019 | Cho | H02M 1/08 |
| 2006/0164273 | A1* | 7/2006 | Hickling | H03M 3/324 |
| | | | | 341/143 |
| 2008/0204290 | A1* | 8/2008 | Parayandeh | H02M 3/157 |
| | | | | 341/143 |
| 2008/0303501 | A1* | 12/2008 | Prodic | H02M 3/157 |
| | | | | 323/283 |
| 2009/0160422 | A1* | 6/2009 | Isobe | H02M 3/156 |
| | | | | 323/349 |
| 2009/0267582 | A1* | 10/2009 | Prodic | H02M 3/157 |
| | | | | 323/283 |
| 2011/0006937 | A1* | 1/2011 | Zoso | H03M 3/422 |
| | | | | 341/143 |
| 2012/0019219 | A1* | 1/2012 | Fang | H02M 3/156 |
| | | | | 323/271 |
| 2012/0153917 | A1* | 6/2012 | Adell | H02M 3/1588 |
| | | | | 323/283 |
| 2012/0194141 | A1* | 8/2012 | Shi | H02M 3/157 |
| | | | | 320/137 |
| 2013/0335049 | A1* | 12/2013 | Schubert | H03K 7/08 |
| | | | | 323/283 |
| 2014/0117955 | A1* | 5/2014 | Zoso | H02M 3/157 |
| | | | | 323/271 |
| 2014/0362605 | A1 | 12/2014 | Jang et al. | |
| 2015/0270779 | A1* | 9/2015 | Im | H02M 3/1588 |
| | | | | 323/271 |
| 2015/0326102 | A1* | 11/2015 | Radhakrishnan | H02M 3/158 |
| | | | | 323/271 |
| 2016/0126839 | A1* | 5/2016 | Chakkirala | H02M 3/156 |
| | | | | 323/271 |
| 2017/0085180 | A1* | 3/2017 | Pulici | H02M 1/08 |
| 2017/0207796 | A1 | 7/2017 | Cho et al. | |
| 2018/0301985 | A1* | 10/2018 | Kesarwani | G05F 1/575 |
| 2019/0326814 | A1* | 10/2019 | Cho | H02M 3/1582 |
| 2021/0036613 | A1* | 2/2021 | Cho | H02M 3/157 |
| 2021/0313881 | A1* | 10/2021 | Parto | H02M 7/003 |

FOREIGN PATENT DOCUMENTS

| | | |
|---|---|---|
| KR | 1020170078647 A | 7/2017 |
| KR | 1020190009131 A | 1/2019 |

OTHER PUBLICATIONS

Mohammad K. Alghamdi et al., A Spurious-Free Switching Buck Converter Achieving Enhanced Light-Load Efficiency by Using a ΔΣ-Modulator Controller With a Scalable Sampling Frequency, Apr. 2012, pp. 841-851, IEEE Journal of Solid-State Circuits, vol. 47, No. 4, Institute of Electrical and Electronics Engineers.

Vratislav Michal, Dynamic Duty-cycle Limitation of the Boost DC/DC Converter allowing Maximal Output Power Operations, 2016, Infineon Technologies Austria AG.

Xiaocheng Jing et al., A Fast Fixed-Frequency Adaptive-On-Time Boost Converter With Light Load Efficiency Enhancement and Predictable Noise Spectrum, Oct. 2013, pp. 2442-2456, IEEE Journal of Solid-State Circuits, vol. 48, No. 10, Institute of Electrical and Electronics Engineers.

Yi Ping Su et al., Current-Mode Synthetic Control Technique for High-Efficiency DC-DC Boost Converters Over a Wide Load Range, Aug. 2014, pp. 1666-1678, IEEE Transactions on Very Large Scale Integration (VLSI) Systems, vol. 22, No. 8, Institute of Electrical and Electronics Engineers.

Young-Kyun Cho et al., A Low Switching Noise and High-Efficiency Buck Converter Using a Continuous-Time Reconfigurable Delta-Sigma Modulator, Dec. 2018, pp. 10501-10511, IEEE Transactions on Power Electronics, vol. 33, No. 12, Institute of Electrical and Electronics Engineers.

Yuh-Shyan Hwang et al., A Fast-Transient Boost Converter With Noise-Reduction Techniques for Wireless Sensor Networks, May 1, 2016, pp. 3188-3197, IEEE Sensors Journal, vol. 16, No. 9, Institute of Electrical and Electronics Engineers.

\* cited by examiner

BOOST DC-DC CONVERTER USING DSM, DUTY CONTROLLER FOR BOOST DC-DC CONVERTER, AND METHOD FOR CONFIGURING DUTY CONTROLLER

CROSS-REFERENCE TO RELATED APPLICATIONS

This application claims priority to Korean Patent Application No. 10-2019-0094332 filed on Aug. 2, 2019 with the Korean Intellectual Property Office (KIPO), the entire contents of which are hereby incorporated by reference.

BACKGROUND

1. Technical Field

The present disclosure generally relates to a boost direct current-to-direct current (DC-DC) converter, a duty controller of the boost DC-DC converter, and a method for configuring the duty controller, and more specifically to, a duty controller limiting a maximum duty ratio in the boost DC-DC converter using a delta-sigma modulation (DSM), and a method for configuring a logic circuit for limiting the maximum duty ratio in the duty controller.

2. Related Art

Portable electronic devices generally and recently use a rechargeable lithium-ion battery having an output voltage ranging from 2.7 to 4.2 V. However, in a mixed signal system processing analog signals and digital signals, it is often required for the mixed signal system that a level of a supply voltage for the mixed signal system is adjusted to be higher than a level of a battery voltage. For this reason, a boost DC-DC converter, which boosts a DC input voltage by converting the DC input voltage to an alternate current (AC) voltage, boosting the AC voltage, rectifying the boosted AC voltage, and outputting the rectified AC voltage, is generally used.

The boost DC-DC converter is required to extend a battery life, decrease a manufacturing cost by minimizing a chip area, and achieve a higher conversion efficiency. In addition, the boost DC-DC converter is required to have a characteristic of low noise in order to achieve a high performance.

Conventionally, a pulse width modulation (PWM) scheme was mainly used for the boost DC-DC converter. However, a delta-sigma modulation scheme is being currently used for decreasing a switching noise by overcoming a disadvantage of the pulse width modulation scheme. The delta-sigma modulation scheme has a strong point of decreasing output harmonics and electromagnetic interferences and having a high conversion efficiency. An output of the delta-sigma modulator based on the delta sigma modulation scheme is determined by a difference between a reference voltage of an error amplifier and an output voltage of the boost DC-DC converter. Therefore, when the reference voltage is much higher than the output voltage, a duty ratio of the boost DC-DC converter may exceed a maximum duty ratio for a steady operation.

When the duty ratio of the boost DC-DC converter exceeds the maximum duty ratio for the steady operation, the output voltage of the boost DC-DC converter may decrease below a target voltage, and a feedback loop circuit may become unstable. In extreme cases, a condition of 100% duty ratio may be established, an energy stored in an inductor of the boost DC-DC converter is not transmitted to a load, and damages transistors, etc. by causing an excessive inductor current.

Therefore, a method of limiting the duty ratio not to exceed a specific limit duty ratio for ensuring a steady operation of the boost DC-DC converter is needed.

SUMMARY

Accordingly, exemplary embodiments of the present disclosure provide a boost DC-DC converter using a delta-sigma converter.

Accordingly, exemplary embodiments of the present disclosure also provide a duty controller for the boost DC-DC converter.

Accordingly, exemplary embodiments of the present disclosure also provide a method for configuring the duty controller.

In order to achieve the objective of the present disclosure, a boost direct current-to-direct current (DC-DC) converter using a delta-sigma modulator, the boost DC-DC converter may comprise a boost driving circuit outputting an output voltage to output terminals by boosting an input voltage, a resistance distribution circuit outputting a feedback voltage by distributing the output voltage of the boost driving circuit, a compensator outputting a compensated feedback voltage by compensating for the feedback voltage outputted by the resistance distribution circuit based on a reference voltage, a delta-sigma modulator outputting a digital signal by modulating the compensated feedback voltage and a duty controller outputting a duty control signal for controlling a switching duty of the boost driving circuit by receiving the output of the delta-sigma modulator.

The boost driving circuit may include a plurality of power switches outputting a boosted input voltage by boosting the input voltage according to switching operations.

The boost driving circuit may include a serial inductor circuit including one end receiving the input voltage and the other end connected to a first electric contact, a first switch circuit including one end connected to the first electric contact and the other end grounded and a second switch circuit including one end connected to the first electric contact and the other end connected to the output terminals.

The duty control signal may be a signal for determining a duty ratio between the plurality of power switches based on the digital signal.

The duty controller may include a delay module delaying the output of the delta-sigma modulator and a shot-signal generator outputting a shot signal by receiving a plurality of delayed signals delayed by the delay module, wherein the duty control signal may be outputted by combining the shot signal with at least one of the plurality of delayed signals.

The delay module may include a plurality of D flip-flops delaying the output of the delta-sigma modulator.

The plurality of D flip-flops may be configured by connecting an output of a preceding D flip-flop to an input of a next D flip-flop, wherein outputs of the D flip-flops are the plurality of delayed signals, respectively.

The shot-signal generator may include a single D flip-flop receiving the plurality of delayed signals and an inverse feedback of the shot signal and outputting the shot signal.

The shot-signal generator may include a NOR gate outputting an output signal by receiving the plurality of delayed signals and an AND gate receiving the output signal of the NOR gate and an inverse shot signal which is the inverse feedback of the shot signal, and providing an input of the single D flip flop.

The duty controller may include an OR gate outputting the duty ratio signal by receiving the shot signal and a signal obtained by delaying the output of the delta-signal modulator by one cycle among the plurality of delayed signals.

In order to achieve the objective of the present disclosure, a duty controller for a boost direct current-to-direct current (DC-DC) converter, the duty controller may comprise a delay module delaying an output of a delta-sigma modulator included in the boost DC-DC converter, a shot-signal generator outputting a shot signal by receiving a plurality of delayed signals delayed by the delay module and a duty controller outputting a duty control signal for a plurality of power switches included in the boost DC-DC converter by combining the shot signal and at least one of the plurality of delayed signals.

The delay module may include a plurality of D flip-flops delaying the output of the delta-sigma modulator.

The plurality of D flip-flops may be configured by connecting an output of a preceding D flip-flop to an input of a next D wherein outputs of the D flip-flops are the plurality of delayed signals, respectively.

The shot-signal generator may include a single D flip-flop receiving the plurality of delayed signals and an inverse feedback of the shot signal and outputting the shot signal.

The shot-signal generator may include a NOR gate outputting an output signal by receiving the plurality of delayed signals and an AND gate receiving the output signal of the NOR gate and an inverse shot signal which is the inverse feedback of the shot signal and providing an input of the single D flip-flop.

The duty controller may include an OR gate outputting the duty ratio signal by receiving the shot signal and a signal obtained by delaying the output of the delta-signal modulator by one cycle among the plurality of delayed signals.

In order to achieve the objective of the present disclosure, a method for configuring a duty controller for a boost direct current-to-direct current (DC-DC) converter, the method may comprise determining a number of D flip-flops included in a delay module of the duty controller, operating the duty controller in a steady state by using the determined number of D flip-flops, measuring an output voltage of the operated duty controller, comparing the output voltage of the operated duty controller with a target voltage and configuring the duty controller by using a finally-determined number of D flip-flops according to a result of the comparison.

The duty controller may include a delay module delaying an output of a delta-sigma modulator included in the boost DC-DC converter and a shot-signal generator outputting a shot signal by receiving a plurality of delayed signals delayed by the delay module, wherein the duty controller may output a duty control signal for a plurality of power switches included in the boost DC-DC converter by combining the shot signal and at least one of the plurality of delayed signals.

After the comparing of the output voltage of the operated duty controller with the target voltage, increasing or decreasing the number of D flip-flops and re-operating the duty controller in a steady state may be further comprised.

The re-operating of the duty controller may include sequentially decreasing the number of D flip-flops from a maximum number or sequentially increasing the number of D flip-flops from a minimum number.

Using the boost DC-DC converter using DSM, the duty controller for the boost DC-DC converter, and the method for configuring the duty controller according to the exemplary embodiments of the present disclosure as described above, a stable operation of the boost DC-DC converter can be ensured, and a targeted output voltage can be obtained.

In addition, there is an advantage that a transient response characteristic of the boost DC-DC converter can be improved and a wide range of an output voltage characteristic can be obtained by maintaining stability of a control loop.

Furthermore, the duty controller can be implemented by configuring a digital circuit with a very simple structure. Therefore, an area occupied by the digital circuit can be small, power consumption can be small, and it is made possible to save cost.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Embodiments of the present disclosure are disclosed herein. However, specific structural and functional details disclosed herein are merely representative for purposes of describing embodiments of the present disclosure, but, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, but, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Figure 1:
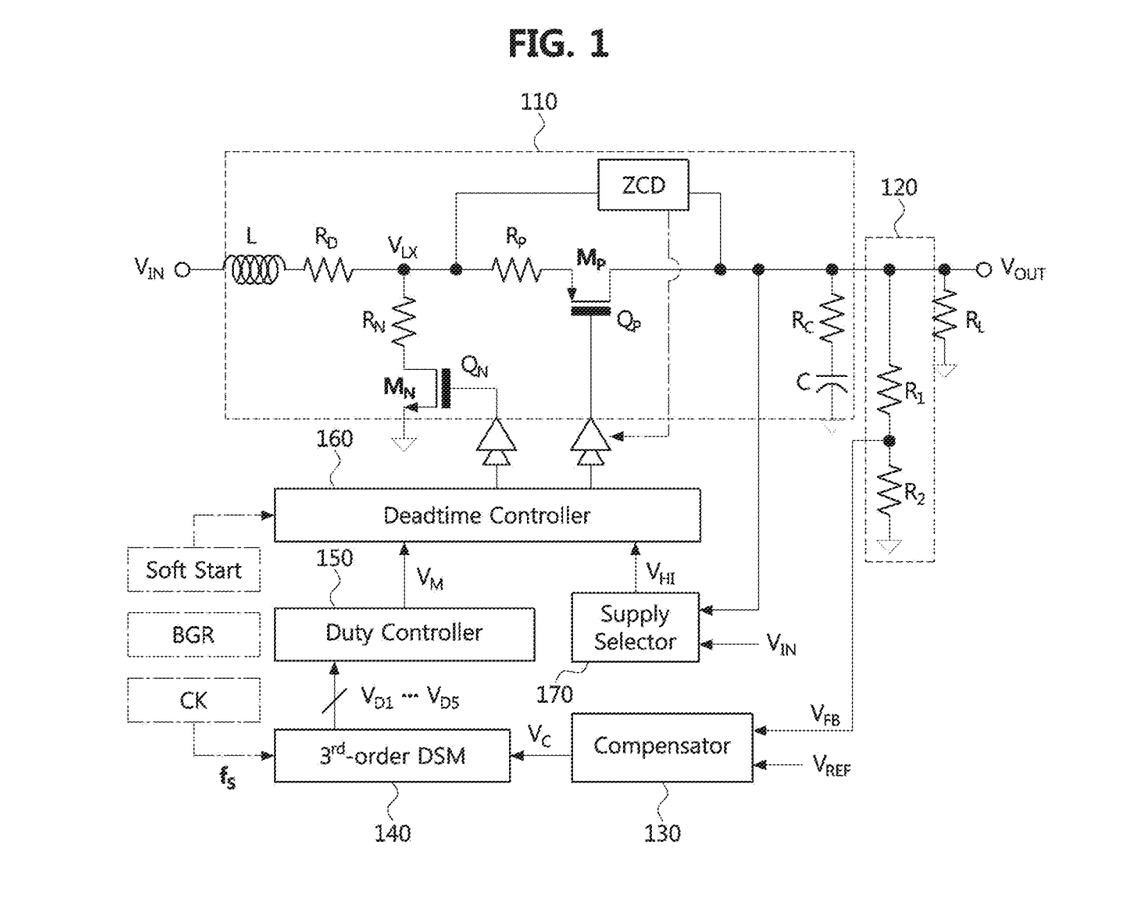
FIG. 1 is an exemplary diagram of a boost DC-DC converter using a DSM according to an exemplary embodiment of the present disclosure.

FIG. 1 is an exemplary diagram of a boost DC-DC converter using a DSM according to an exemplary embodiment of the present disclosure.

Referring to FIG. 1, a boost DC-DC converter may comprise a boost driving circuit 110 outputting an output voltage $V_{out}$ to output terminals by boosting an input voltage $V_{in}$, a resistance distribution circuit 120 outputting a feedback voltage $V_{FB}$ by distributing the output voltage $V_{out}$ of the boost driving circuit 110, a compensator 130 outputting a compensated feedback voltage by compensating for the feedback voltage outputted by the resistance distribution circuit 120, a delta-sigma modulator (DSM) 140 outputting a digital signal by modulating the output of the compensator 130, and a duty controller 150 outputting a duty control signal for controlling a switching duty of the boost driving circuit 110 by receiving the output of the delta-sigma modulator 140.

Particularly, the boost driving circuit 110 may include a plurality of power switches (e.g., $M_N$, $M_P$) outputting a boosted input voltage by boosting the input voltage. The delta-sigma modulator 140 may generate a digital signal controlling ON/OFF time of the plurality of power switches (e.g., $M_N$, $M_P$) by receiving the output of the compensator 130.

Particularly, the boost DC-DC converter may further include a deadtime controller 160 controlling a dead time between the output of the duty controller 150 and switching operations of the plurality of power switches (e.g., $M_N$, $M_P$). The deadtime may mean a time delay between time points at which the switching operations of the plurality of power switches change (e.g., state transition to ON or OFF) over a predetermined limit according to the output of the duty controller 150.

In addition, the boost DC-DC converter may further include a load resistance $R_L$, which is connected to the output terminals and receives the output voltage $V_{out}$. In addition, the boost DC-DC converter may further include a supply selector which receives a separate power and provides the deadtime controller 160 with a supply voltage $V_{HI}$ selected within a predetermined range of a supply voltage.

Particularly, the feedback voltage $V_{FB}$ may be determined by distributing the output voltage $V_{out}$ according to a resistance distribution ratio (e.g., a ratio of $R_1$ and $R_2$ in FIG. 1). The compensator 130 may identify a level of the output voltage based on a pre-configured or inputted reference voltage $V_{REF}$.

Particularly, the boost driving circuit 110 may include the plurality of power switches (e.g., $M_N$, $M_P$) boosting the input voltage based on the switching operations and outputting the boosted input voltage. The delta-sigma modulator 140 may generate a digital signal controlling ON/OFF times of the plurality of power switches (e.g., $M_N$, $M_P$) by receiving the output of the compensator 130.

Particularly, the duty control signal may be a signal determining a duty ratio between the plurality of power switches (e.g., $M_N$, $M_P$) based on the digital signal. For example, in case that there are two power switches (e.g., $M_N$, $M_P$) in the boost driving circuit 110 as shown in FIG. 1 only the first power switch $M_N$ may operate in the ON state, when the duty control signal indicates a duty ratio of 100%. In addition, only the second power switch may operate in the ON state, when the duty control signal indicates a duty ratio of 0%. Therefore, hereinafter, the duty ratio may mean the duty ratio of the boost DC-DC converter or the duty ratio between the plurality of power switches (e.g., $M_N$, $M_P$) included in the boost driving circuit 110.

More specifically, the boost driving circuit 110 may include a serial inductor circuit including one end receiving a serial input voltage $V_{IN}$ and the other end connected to a first electric contact $V_{LX}$, a first switch circuit including one end connected to the first electric contact and the other end grounded, and a second switch circuit including one end connected to the first electric contact, and the other end connected to the output terminal.

In addition, the boost driving circuit 110 may further include a zero-current detector (ZCD) connected in parallel to the second switch circuit. The ZCD may sense a point where a current flowing the second switch circuit crosses zero, and apply a switching control input to the second switch circuit. In addition, the boost driving circuit 110 may further include a capacitor circuit, which includes one end being the output terminal and the other end grounded. The capacitor circuit may be configured by connecting a capacitor resistance $R_c$ to a capacitor C in serial dd.

The serial inductor circuit may include an inductor L connected to an inductor resistance $R_D$ in serial. The first switch circuit may include a first switch resistance $R_N$ connected to the first power switch $M_N$ in serial. For example, the first power switch $M_N$ may be an N-type transistor, but may be replaced with a diode. The second switch circuit may include a second switch resistance $R_P$ connected to the second power switch $M_P$ in serial. For example, the second power switch $M_P$ may be a P-type transistor, but may be replaced with a diode.

Particularly, the duty controller 150 will be specifically described with reference to FIG. 3 and other components may be appropriately modified by those skilled in the art. For example, the delta-sigma modulator may be a $3^{rd}$ order modulator, but the delta-sigma modulator may also be other digital modulators such as a $3^{rd}$ order modulator or a $2^{nd}$ order modulator. In addition, the inductor resistance $R_D$ may be an equivalent resistance of the inductor L or a resistance including the equivalent resistance of the inductor L. The capacitor resistance $R_C$ may be an equivalent resistance of the capacitor C or a resistance including the equivalent resistance of the capacitor C. The first switch resistance $R_N$ may be an equivalent resistance of the first power switch $M_N$ or a resistance including the equivalent resistance of the first power switch $M_N$. The second switch resistance $R_P$ may be an equivalent resistance of the second power switch $M_P$ or a resistance including the equivalent resistance of the second power switch $M_P$.

In the present disclosure, exemplary embodiments based on the boost DC-DC converter according to FIG. 1 are described, but the exemplary embodiments are not limited thereto. For example, the boost DC-DC converter may be replaced with a various type of a boost DC-DC converter to which a boost technique is applied, such as a Buck-Boost Converter.

Figure 2:
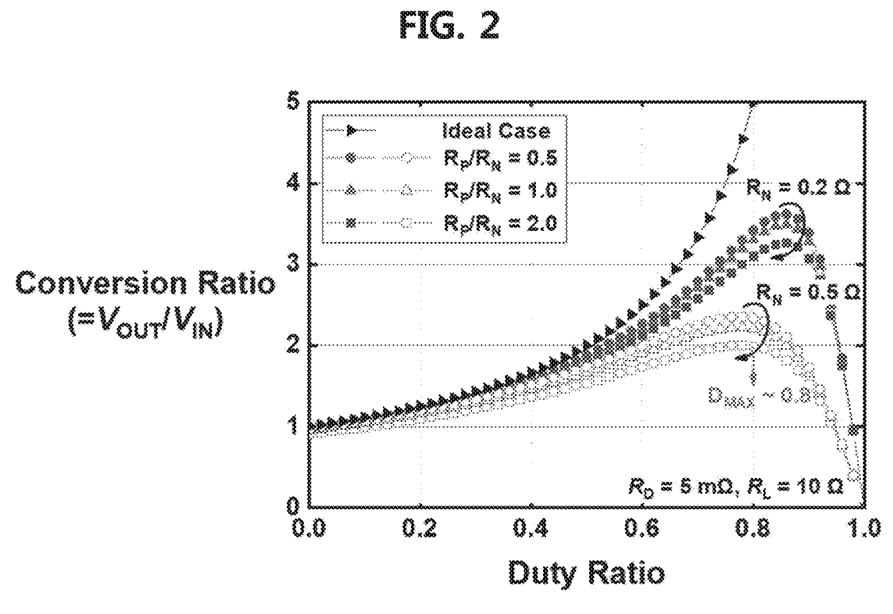
FIG. 2 is a graph of a voltage conversion ratio of a boost DC-DC converter using a DSM according to an exemplary embodiment of the present disclosure.

FIG. 2 is a graph of a voltage conversion ratio of a boost DC-DC converter using a DSM according to an exemplary embodiment of the present disclosure.

The equivalent resistances for the respective elements (e.g., the inductor, the capacitor, the power switches, etc.) may be regarded as 0, considering an ideal case in the boost DC-DC converter using the DSM according to FIG. 1. When such the ideal case is assumed, a voltage conversion ratio $M_{ideal}$ representing a ratio an output voltage $V_{OUT}$ of the boost DC-DC converter to an input voltage $V_{IN}$ of the boost DC-DC converter may be expressed as Equation 1 below:

$$M_{ideal} = \frac{V_{OUT}}{V_{IN}} = \frac{1}{1-D} \quad \text{[Equation 1]}$$

In Equation 1, the voltage conversion ratio $M_{ideal}$ in the ideal case may be higher as the duty ratio D of the boost DC-DC converter closes to 1. Referring to FIG. 2, in a graph of the ideal case, a voltage conversion ratio M may be higher as the duty ratio of the boost DC-DC converter D closes to 1.

However, in a practical case not in the ideal case, the resistances $R_D$, $R_N$, and, $R_P$ in FIG. 1 may have finite values, because internal resistances may exist in the inductor or the power switches, etc. Therefore, the voltage conversion ratio M in the practical case may be expressed as Equation 2 below:

$$M = \frac{R_L \cdot (1-D)}{R_L \cdot D^2 - (2R_L + R_P - R_N) \cdot D + R_L + R_P - R_D} \quad \text{[Equation 2]}$$

In Equation 2, the maximum voltage conversion ratio may be limited by the resistances (e.g., $R_L$, $R_P$, $R_D$, and $R_N$), and a maximum duty ratio $D_{max}$ may exist. The maximum duty ratio $D_{max}$ may be a maximum value of the duty ratio D that increases as the voltage conversion ratio increases. That is, when the voltage conversion ratio M is over the maximum voltage conversion ratio, even if the duty ratio D increases, the voltage conversion ratio M may be decreased, and thus the boost DC-DC converter may not operate in steady condition.

Referring to FIG. 2, a voltage conversion ratio according to a duty ratio, when the inductor resistance $R_D$ and the output resistance $R_L$ are set to fixed values, and a ratio $\frac{R_P}{R_N}$ between the equivalent resistance (or, ON-resistance $R_N$) of the first power switch and the equivalent resistance (or, ON-resistance $R_P$) of the second power switch varies, may be shown.

Specifically, the graph may show that the voltage conversion ratio increases as the duty ratio increases, and decreases although the duty ratio increases when the duty ratio exceeds a predetermined duty ratio (e.g., the maximum duty ratio). In this case, the maximum duty ratio $D_{max}$ may be decreased when the respective equivalent resistances of the power switches are increased (e.g., $R_N$ increases from 0.2 to 0.5, and $R_P$ increases with a rate identical to that of $R_N$). On the other hand, referring back to Equation 2, the maximum duty ratio $D_{max}$ may tend to be decreased as the load resistance $R_L$ is decreased, because the voltage conversion ratio is affected by the load resistance $R_L$.

As a result, the voltage conversion ratio (or, the maximum output voltage obtained by the voltage conversion ratio) may be determined by the equivalent resistances of the respective power switches and the load resistance $R_L$. For example, referring to FIG. 2, when the equivalent resistances of the respective power switches are small (e.g., $R_N$ is 0.2 and $R_P$ is 0.1), and the load resistance ($R_L$) is 10Ω, the maximum voltage conversion ratio (e.g., ranging from 3 to 4), and the maximum duty ratio (e.g., 0.85) may be achieved. In addition, when the equivalent resistances of the respective power switches are large (e.g., $R_N$ is 0.5 and $R_P$ is 1) and the load resistance is 10Ω, the smallest voltage conversion ratio e.g., equal to or less than 2), and the smallest maximum duty ratio (e.g., 0.8) may be achieved.

As described above, since the voltage conversion ratio may be decreased when the duty ratio is over a predetermined range, the boost DC-DC converter may not operate in steady condition, and stability of the control loop may be broken. Therefore, the duty ratio of the delta-sigma modulator may be preferably used within the maximum duty ratio.

However, since the delta-sigma modulator or the digital modulator outputs a digital signal for a signal provided by the compensator, unlike a general pulse-width modulator (PWM), it may not be easy to control the duty ratio of the delta-sigma modulator or the digital modulator. That is, the pulse-width modulator may control the duty ratio by using an analog control scheme (e.g., V. Michal, "Dynamic Duty-Cycle Limitation of the Boost DC/DC Converter Allowing Maximal Output Power Operations," in Int. Conf. Applied Electronics, 2016, pp. 177-182.), but the analog control scheme may not be applied when a feedback loop is controlled by the digital signal. That is, since the digital signal may not be lowered than a clock signal, the analog scheme may not be applied. In order to solve this problem, a duty controller controlling the duty ratio of the boost DC-DC converter not to exceed the maximum duty ratio for operating in steady condition may be introduce& In addition, the duty controller may be specifically described in following FIG. 3.

Figure 3:
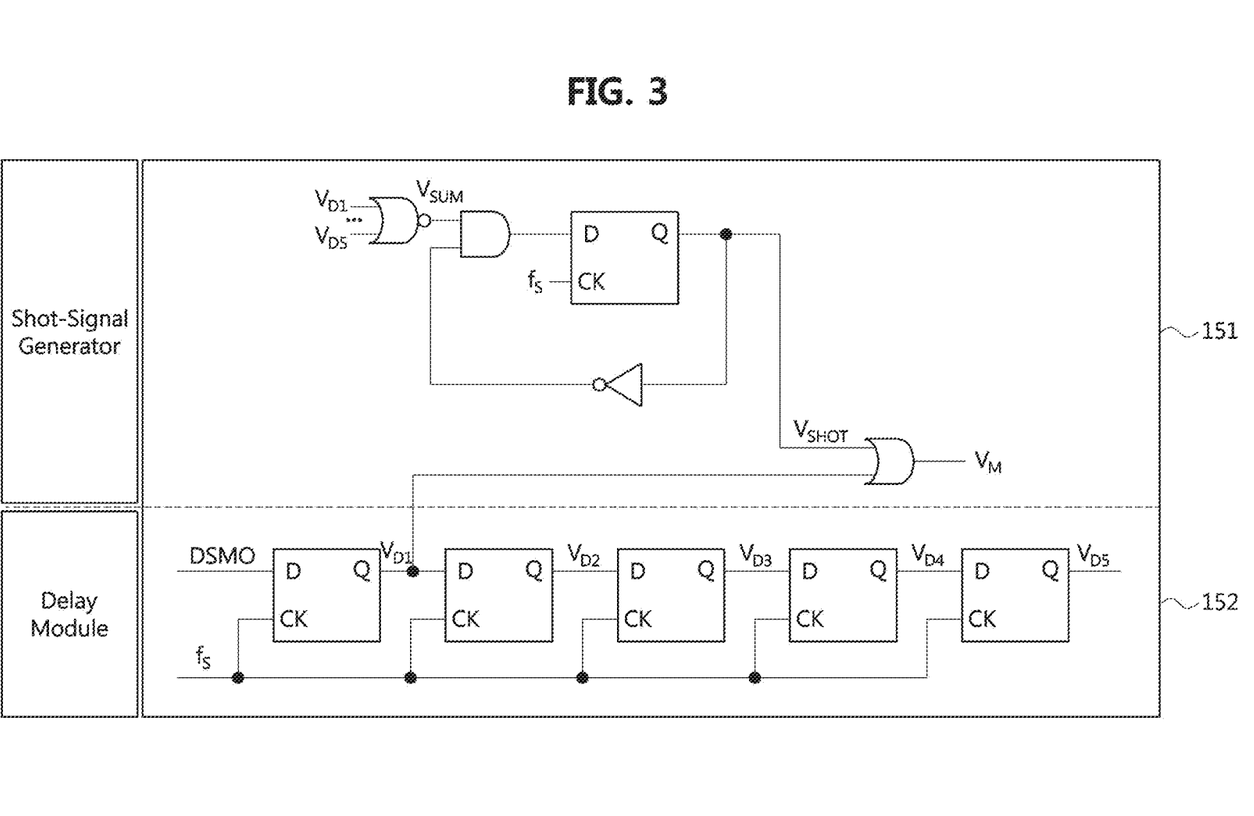
FIG. 3 is a conceptual diagram of a duty controller for a boost DC-DC converter according to an exemplary embodiment of the present disclosure.

FIG. 3 is a conceptual diagram of a duty controller for a boost DC-DC converter according to an exemplary embodiment of the present disclosure.

Referring to FIG. 3, a duty controller according to some embodiments of the present disclosure may include a delay module 152 for delaying an output of a delta-signal modulator (DSMO), and a shot-signal generator for outputting a shot signal $V_{SHOT}$ by receiving a plurality of delayed signals $V_{D1}$, $V_{D2}$, $V_{D3}$, $V_{D4}$, and $V_{D5}$ that are delayed by the delay module 152.

The duty controller may output a duty control signal $V_M$ by combining the shot signal $V_{SHOT}$ and at least one of the plurality of delayed signals. The delta-sigma modulator may be the delta-sigma modulator 150 in FIG. 1. However, the delta-sigma modulator may be replaced with other digital modulators.

Specifically, the delay module 152 may include a plurality of D flip-flops for delaying the output of the delta-sigma modulator 150. For example, in order to generate five delayed signals by delaying the output of the delta-sigma modulator for five cycles, the plurality of D flip-flops may be configured as five D flip-flops, and the plurality of D flip-flops may be configured by connecting an output of a preceding D flip-flop to an input of a next D flip-flop.

In this case, each output of each of the D flip-flops may be the delayed signal. In addition, an output passing through one D flip-flop may be a first delayed signal obtained by delaying the output of the delta-sigma modulator by one cycle. An output passing through two D flip-flops may be a second delayed signal $V_{D2}$ obtained by delaying the output of the delta-sigma modulator by two cycles. Then, a clock signal $f_s$ may be commonly inputted to the plurality of D flip-flops.

In addition, the shot-signal generator 151 may include a single D flip-flop receiving the plurality of delayed signals and inverse feedback of the shot signal and outputting the shot signal. More specifically, the shot-signal generator 151 may include a NOR gate outputting an output signal by receiving the plurality of delayed signals and an AND gate receiving the output signal of the NOR gate and an inverse shot signal which is the inverse feedback of the shot signal and providing as an input to the single D flip-flop.

Particularly, the NOR gate may output a high signal $V_{SUM}$, when all of the delayed signals are low at the same time. Therefore, the NOR gate may output the high signal $V_{SUM}$, when the output of the delta-signal modulator is low for multiple cycles. In addition, the high signal $V_{SUM}$ may activate the single D flip-flop so that the single D flip-flop outputs the shot signal $V_{SHOT}$. Also, the shot-signal generator 151 may further include a NOT gate for processing the inverse feedback of the shot signal, which the NOT gate may receive the shot signal and output the inverse shot signal.

Finally, the duty controller may have the output of the duty control signal $V_M$ by inputting the shot signal $V_{SHOT}$ and one of the plurality of delayed signals to an OR gate. For example, the duty controller may output the duty control signal $V_M$ by inputting the shot signal and the first delayed signal (i.e., the first delayed signal obtained by delaying the output of the delta-sigma modulator, that is delayed by one cycle) to the OR gate. In this case, the outputted duty control signal $V_M$ may be provided as the input of the deadtime controller according to FIG. 1.

FIG. 3 shows that the duty controller according to some embodiments has a very simple structure compared to a duty controller of the conventional analog scheme. The duty controller can be implemented using a simple digital circuit, referring to FIG. 3. Therefore, the duty controller according to an exemplary embodiment of the present disclosure may have strong points in a chip area occupied by the circuit and power consumption.

Meanwhile, in order to generate five delayed signals, the delay module 152 in FIG. 3 is configured to have five flip-flops, and each output of the preceding D flip-flop is continuously connected to the input of the next D flip-flop in the five D flip-flops. However, it may be understood as an example, and the number of the D flip-flops may be various based on the maximum duty ratio to be limited.

Figure 4:
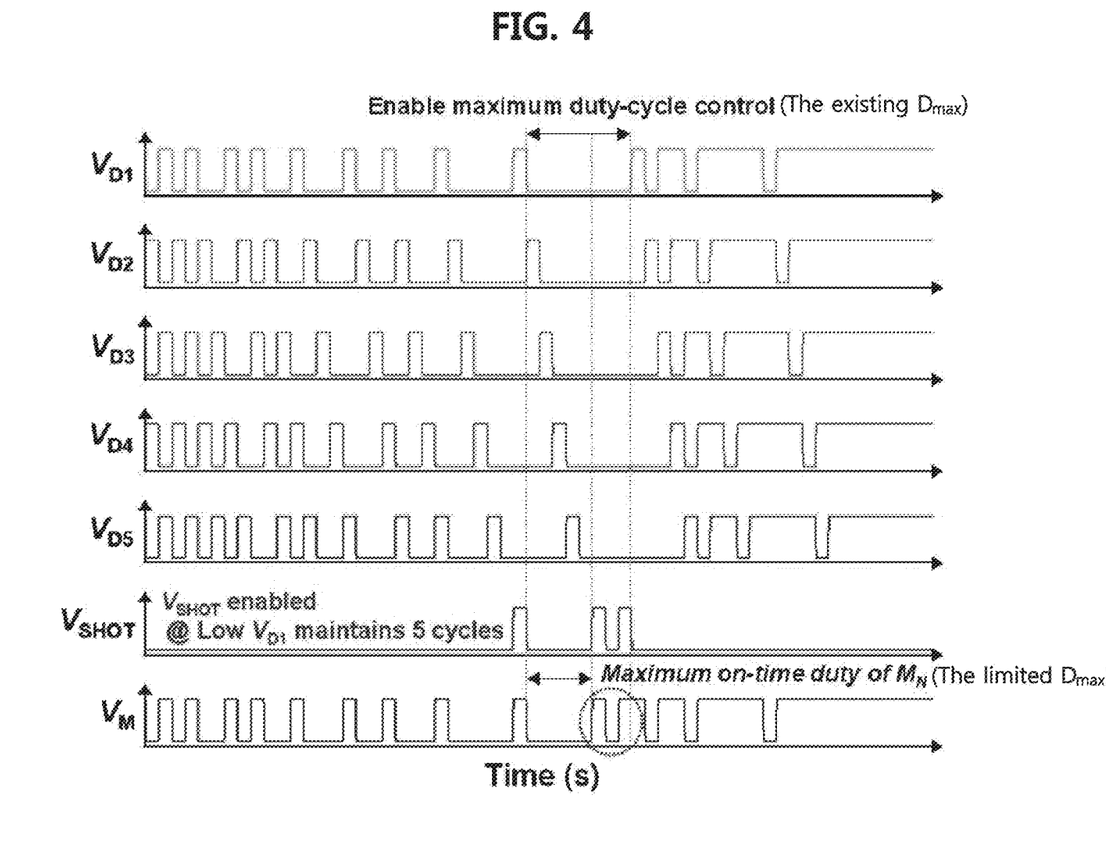
FIG. 4 is a graph of an operation of a duty controller for a boost DC-DC converter according to an exemplary embodiment of the present disclosure.

FIG. 4 is a graph of an operation of a duty controller for a boost DC-DC converter according to some embodiments of the present disclosure.

Referring to FIG. 4, output signals generated over time by the duty controller according to FIG. 3 may be shown. Specifically, when all of the plurality of delayed signals have low signals at the same time (i.e., the outputs of the delta-sigma modulator have low signals for five cycles), and when the shot signal $V_{SHOT}$ is generated, the duty control signal $V_M$ which is marked with a dotted circle may be shown in FIG. 4. The plurality of delayed signals may be $V_{D1}$, $V_{D2}$, $V_{D3}$, $V_{D4}$, and $V_{D5}$, when the duty controller is configured with five D flip-flops as described in FIG. 3.

In this way, the duty ratio may be effectively limited, because the maximum duty ratio (i.e., the limited $D_{MAX}$ in FIG. 4 may be represented to be further limited by the shot signal additionally generated than the existing duty ratio (i.e., the existing $D_{MAX}$ in FIG. 4). Meanwhile, as explained in the description according to FIG. 3, the maximum duty ratio may be effectively changed by changing the number of D flip-flops included in the delay module of the duty controller. For example, the maximum duty ratio varying according to the number of D flip-flops included in the delay module of the duty controller in FIG. 3 is shown in Table 1 below.

TABLE 1

| N(DFF) | 10 | 9 | 8 | 7 | 6 | 5 | 4 | 3 | 2 |
|---|---|---|---|---|---|---|---|---|---|
| Dmax | 91 | 90 | 89 | 87.5 | 86 | 83 | 80 | 75 | 67 |

Referring to Table 1, it is shown the maximum duty ratio $D_{max}$, when the number of D flip-flops, N(DFF), varies from two to ten, included in the delay module. The maximum duty ratio $D_{max}$ may be 83% by using the five D flip-flops as shown in FIG. 3. In addition, the maximum duty ratio $D_{max}$ may be increased as the number of D flip-flops increases, because the output of the delta-sigma modulator may be maintained in low condition for a longer cycle and/or time as the number of D flip-flops increases.

Figure 5:
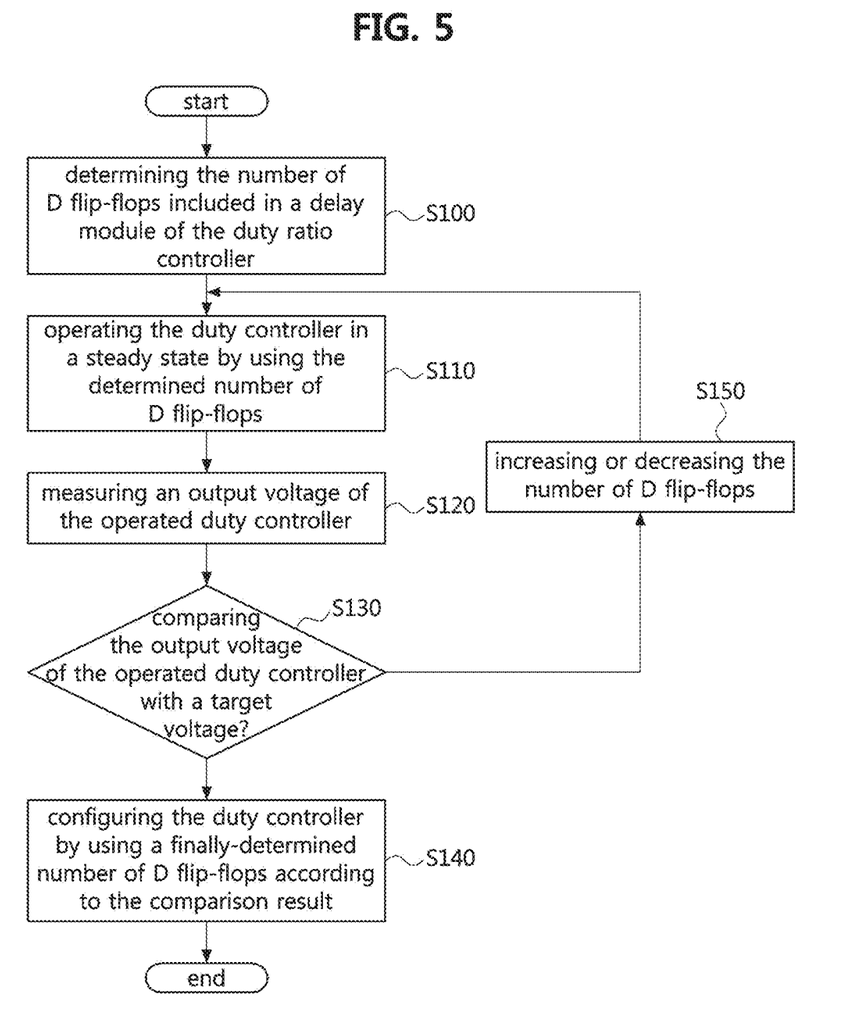
FIG. 5 is a flowchart of a method for configuring a duty controller for a boost DC-DC converter according to an exemplary embodiment of the present disclosure.

FIG. 5 is a flowchart of a method for configuring a duty controller for a boost DC-DC converter according to some embodiments.

As described in Table 1, the maximum duty ratio may vary according to the number of D flip-flops included in the delay module. In this case, the maximum duty ratio by which the boost DC-DC converter can operate steadily may vary according to a target input/output voltage (or, voltage conversion ratio), as well as various system parameters. The system parameters may include the switches, the inductor, and the load resistance, which constitute the boost DC-DC converter. Therefore, when the duty controller is to be universally applied to various boost DC-DC converters operating in environments where such system parameters are not fixed, since the system parameters vary, it is necessary for the maximum duty ratio to be automatically determined.

For example, based on the system parameters for the boost DC-DC converter to which the duty controller is applied, a lookup table may be configured by calculating maximum duty ratio by which the duty controller can operate steadily, and the number of D flip-flops may be dynamically determined according to the maximum duty ratio with reference to the lookup table. When the above scheme is used, a sufficient number of D flip-flops may be provided in the delay module, and the number of D flip-flops may be activated as many as the number of D flip-flops dynamically determined.

Specifically, referring to FIG. 5, the method for configuring the duty controller according to some embodiments may comprise determining the number of D flip-flops included in a delay module of the duty controller S100, operating the duty controller in a steady state by using the determined number of D flip-flops S110, measuring an output voltage of the operated duty controller S120, comparing the output voltage of the operated duty controller with a target voltage S130, and configuring the duty controller by using a finally-determined number of D flip-flops according to the comparison result S140.

Particularly, an initial number of D flip-flops may be the configurable smallest number or configurable largest number. More specifically, assuming that the predetermined number of D flip-flops are implemented in the delay module of the duty controller and the flip-flops are selectively activated, the initial number of D flip-flops may be determined (and, activated) one or two, the initial number of D flip-flops may be determined (and, activated) as many as the number of all D Flip-flops already implemented.

In addition, the method for configuring the duty controller may further comprise after the comparing of the output voltage of the operated duty controller with the target voltage S130, increasing or decreasing the number of D flip-flops s150 and reprocessing the operating the duty controller in a steady-state S110. Specifically, the reprocessing may be implemented when a comparison result by comparing the output voltage of the operated duty controller with the target voltage S130 is equal to or lower than the target voltage.

For example, in case that the number of D flip-flops is determined to be one (or, the configurable smallest number) in S100, the number of D flip-flops may be increased by one. In case, the number of D flip-flops determined in S100 is one, the boost DC-DC converter may not boost the output voltage to the maximum voltage conversion ratio, because the maximum duty ratio to enable may be only 50% (or, 0.5). Therefore, the number of D flip-flops sequentially increases, the maximum duty ratio may increase, and the output voltage which is close to the maximum voltage conversion ratio may be obtained.

In addition, in case, the number of D Flip-flop is determined to be the maximum number (or the number of all implemented D Flip-flops) in S100, the number of D flip-flops may be decreased by one. In case, when the number of D flip-flops determined is a maximum number, the voltage conversion ratio may be decreased (e.g., the part of graphs that slope value decrease to negative in FIG. 2), because a maximum duty ratio may be a duty ratio after the maximum duty ratio (e.g., corresponds to the duty ratio in case that inclination in the graph of FIG. 2 is 0). Therefore, the number of D flip-flops may sequentially decrease, the maximum duty ratio may decrease, and the output voltage which is close to the maximum voltage conversion ratio (e.g., the voltage conversion ratio in case that the inclination in the graph of FIG. 2 is 0) may be obtained.

That is, according to some embodiments of the present disclosure, a delay module (or a duty controller including the delay module) may be configured with the number of D Flip-flops outputting an output voltage closest to the target voltage by sequentially increasing or decreasing the number of D flip-flops included in the delay module of the duty controller.

Figure 6:
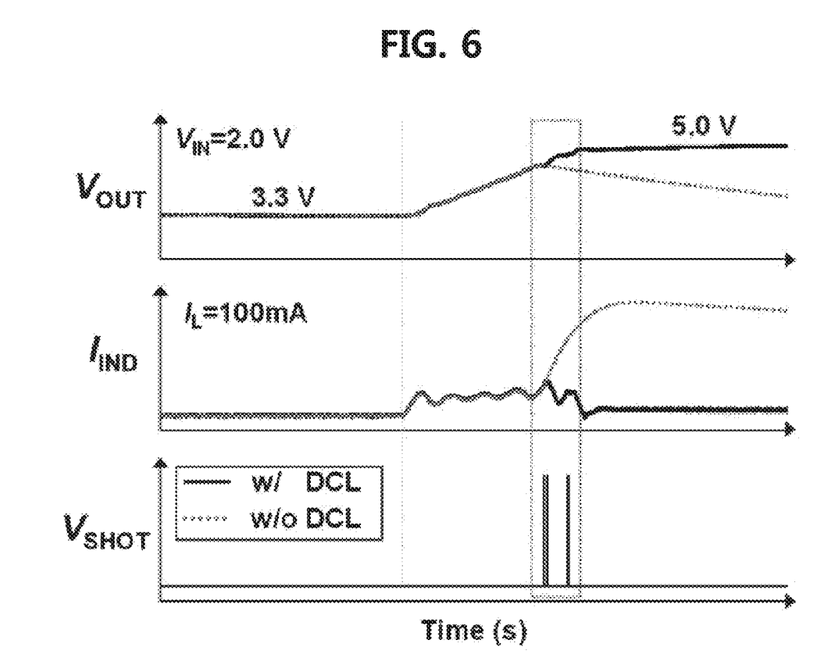
FIG. 6 is a graph of a result of simulating of a boost DC-DC converter applying a duty controller according to an exemplary embodiment of the present disclosure.

The graph in FIG. 6 shows a result of simulating a boost DC-DC converter applied a duty controller according to some embodiments of the present disclosure.

Referring to FIG. 6, the part of graphs displayed with a dotted line shows the inductor current $I_{IND}$ and the output voltage V-OUT, when the duty controller according to some embodiments is not applied. In addition, the part of graphs displayed with a solid line is the inductor current $I_{IND}$, output voltage $V_{OUT}$ and shot signal $V_{SHOT}$ when the duty controller according to some embodiments is applied.

First, considering in case, the duty controller according to some embodiments is not applied to the boost DC-DC converter, duty condition of 100% may occur, which the shot signal $V_{SHOT}$ is not generated and only the first power switch $M_N$ in FIG. 1 operates in the on state. In this case, the inductor current $I_{IND}$ may excessively occur as shown as part of the middle graph (e.g., the dotted line in FIG. 6). Therefore, the output voltage $V_{out}$ as shown in the first graph (e.g., the dotted in FIG. 6) may decrease, and finally, a feedback loop may be unstable, and a malfunction of the feedback loop may be caused.

Next, in case that the duty controller according to some embodiments of the present disclosure is applied to the boost DC-DC converter, the shot signal $V_{SHOT}$ may occur as shown in the lowest graph in FIG. 6. The switching duty ratio among power switches included in the boost DC-DC converter may be restricted by the shot signal $V_{SHOT}$. Therefore, the target voltage may be obtained by preventing the boost DC-DC converter to malfunction beyond a maximum duty ratio and making the boost DC-DC converter operate with stability. At this time, although the switching duty ratio of the power switches is forcibly limited by the shot signal, control stability may be maintained since the compensator 130 and the delta-sigma modulator 140 described in FIG. 1 sufficiently flexible to implement for a change of the output voltage according to the changed switching duty ratio. Therefore, in case that the boost DC-DC converter is implemented by using the proposed duty controller, a wide range of output voltage characteristics may be obtained from the improved transient response characteristics.

Figure 7:
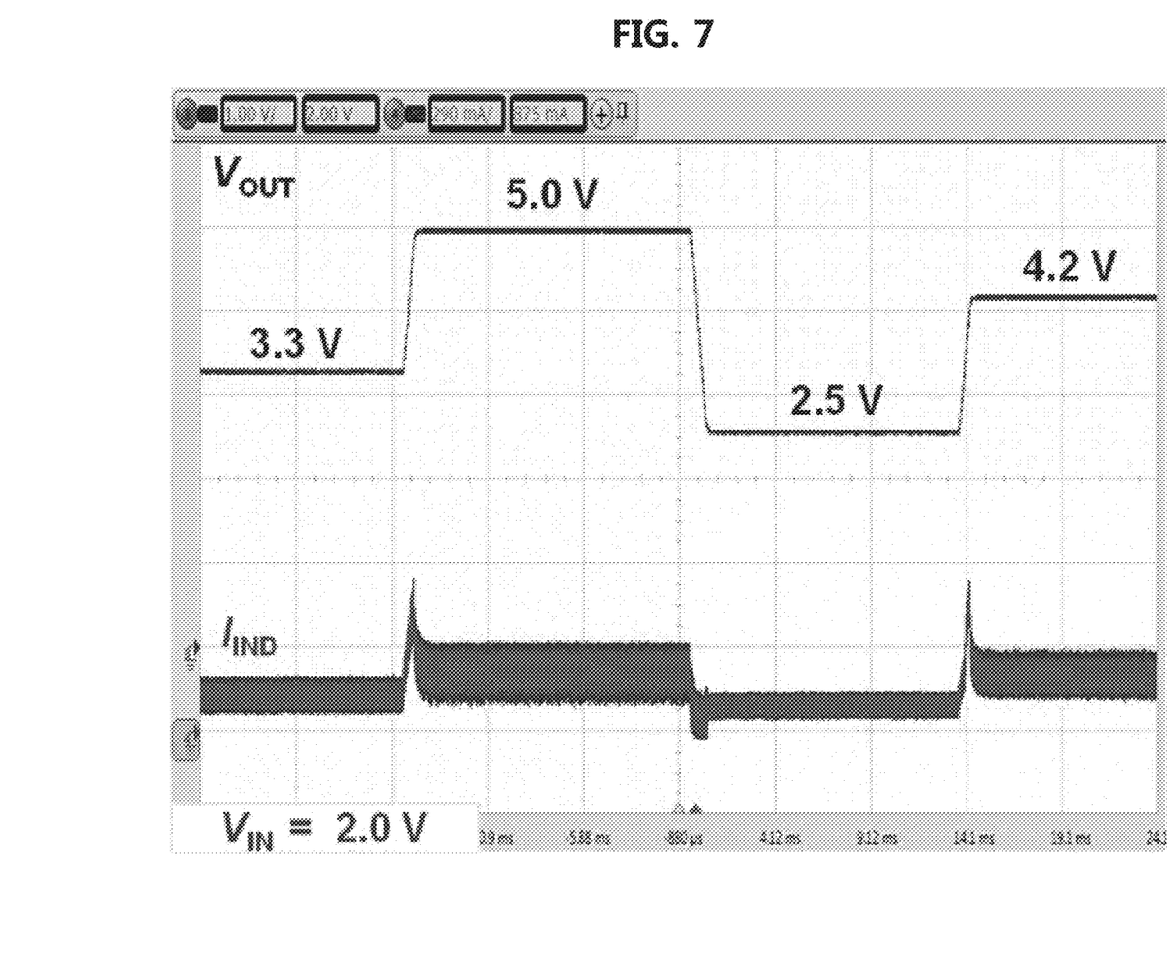
FIG. 7 is a graph of a result of modulating an output voltage of a boost DC-DC converter implemented by using a duty controller according to an exemplary embodiment of the present disclosure.

The graph in FIG. 7 shows a result of modulating an output voltage of a boost DC-DC converter implemented by using a duty controller according to some embodiments of the present disclosure.

Referring to FIG. 7 a graph which indicates the result of applying the duty controller configured according to FIGS. 3 and 5 to the boost DC-DC converter and adjusting the output voltage may be confirmed.

The output voltage of the boost DC-DC converter may be dynamically controlled by changing a reference voltage $V_{REF}$ that is an input voltage of the compensator included in the boost DC-DC converter. Accordingly, the output voltage may be controlled, ranging from 2.5 to 5.0 V, when the input voltage $V_{IN}$ is 2.0V.

That is, the target voltage obtained easily by being applied a duty controller according to some embodiments of the present disclosure to a boost DC-DC converter, and stable and robust operation of the boost DC-DC converter may be guaranteed.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A boost direct current-to-direct current (DC-DC) converter using a delta-sigma modulator (DSM), the boost DC-DC converter comprising:
   a boost driving circuit configured to boost an input voltage, to output an output voltage to an output terminal;
   a resistance distribution circuit configured to distribute the output voltage of the boost driving circuit, and to output a feedback voltage;
   compensator configured to compensate for the feedback voltage outputted by the resistance distribution circuit based on a reference voltage, and to output a compensated feedback voltage;
   a delta-sigma modulator (DSM) configured to modulate the compensated feedback voltage, and to output as a digital signal; and
   a duty controller configured to receive the output of the DSM, and to output a duty control signal for controlling a switching duty of the boost driving circuit,
   wherein the duty controller includes:
      a delay module delaying the output of the DSM; and
      a shot-signal generator outputting a shot signal by receiving a plurality of delayed signals delayed by the delay module,
      wherein the shot signal and at least one of the plurality of delayed signals are combined to output the duty control signal.

2. The boost DC-DC converter according to claim 1, wherein the boost driving circuit includes a plurality of power switches outputting a boosted input voltage by boosting the input voltage according to switching operations.

3. The boost DC-DC converter according to claim 2, wherein the duty control signal is a signal for determining a duty ratio between the plurality of power switches based on the digital signal.

4. The boost DC-DC converter according to claim 1, wherein the boost driving circuit includes:
   a serial inductor circuit including one end receiving the input voltage and the other end connected to a first electric contact;
   a first switch circuit including one end connected to the first electric contact and the other end grounded; and
   a second switch circuit including one end connected to the first electric contact and the other end connected to the output terminal.

5. The boost DC-DC converter according to claim 1, wherein the delay module includes a plurality of D flip-flops delaying the output of the DSM.

6. The boost DC-DC converter according to claim 5, wherein the plurality of D flip-flops are configured by connecting an output of a preceding D flip-flop to an input of a next D flip-flop, wherein outputs of the D flip-flops are the plurality of delayed signals, respectively.

7. The boost DC-DC converter according to claim 1, wherein the shot-signal generator includes a single D flip-flop configured to receive the plurality of delayed signals and inverse feedback of the shot signal, to output the shot signal.

8. The boost DC-DC converter according to claim 7, wherein the shot-signal generator includes:
   a NOR gate configured to receive the plurality of delayed signals, and to output an output signal; and
   an AND gate configured to receive the output signal of the NOR gate and an inverse shot signal by inverse feedback of the shot signal, and to provide an input of the single D flip-flop.

9. The boost DC-DC converter according to claim 1, wherein the duty controller includes an OR gate configured to receive the shot signal and a signal obtained by delaying the output of the DSM by one cycle among the plurality of delayed signals, and to output the duty control signal.

10. A duty controller for a boost direct current-to-direct current (DC-DC) converter, the duty controller comprising:
    a delay module configured to delay an output of a delta-sigma modulator (DSM) included in the boost DC-DC converter; and
    a shot-signal generator configured to receive a plurality of delayed signals delayed by the delay module, and to output a shot signal,
    wherein the shot signal and at least one of the plurality of delayed signals are combined to output a duty control signal for a plurality of power switches included in the boost DC-DC converter.

11. The duty controller according to claim 10, wherein the delay module includes a plurality of D flip-flops delaying the output of the delta-sigma modulator.

12. The duty controller according to claim 11, wherein the plurality of D flip-flops are configured by connecting an output of a preceding D flip-flop to an input of a next D wherein outputs of the D flip-flops are the plurality of delayed signals, respectively.

13. The duty controller according to claim 10, receiving the plurality of delayed signals and inverse feedback of the shot signal, and outputting the shot signal.

14. The duty controller according to claim 3, wherein the shot-signal generator includes:
    a NOR gate configured to receive the plurality of delayed signals, to output an output signal; and
    an AND gate configured to receive the output signal of the NOR gate and an inverse shot signal that is the inverse feedback of the shot signal, and provide for an input of a single D flip-flop.

15. The duty controller according to claim 10, wherein the duty controller includes an OR gate outputting a duty ratio signal by receiving the shot signal and a signal obtained by delaying the output of the DSM by one cycle among the plurality of delayed signals.

16. A method for configuring a duty controller for a boost direct current-to-direct current (DC-DC) converter, the method comprising:

determining a first number of D flip-flops included in a delay module of the duty controller;

operating the duty controller in a steady state by using the determined number of D flip-flops;

measuring an output voltage of the operated duty controller;

comparing a measured output voltage with a target voltage;

determining a second number of D flip-flops based on a result of the comparing of the measured output voltage with the target voltage; and configuring the duty controller for the boost DC-DC converter by using a second number of D flip-flops, wherein the first number of D flip-flops is different from the second number of D flip-flops.

17. The method according to claim 16, wherein the duty controller includes:

a delay module delaying an output of a delta-sigma modulator (DSM) included in the boost DC-DC converter; and a shot-signal generator outputting a shot signal by receiving a plurality of delayed signals delayed by the delay module, wherein the shot signal and at least one of the plurality of delayed signals are combined to output a duty control signal for a plurality of power switches included in the boost DC-DC converter.

18. The method according, to claim 17, increasing or decreasing the second number of D flip-flops; and reprocessing the operating the duty controller in the steady state.

19. The method according to claim 18, wherein the reprocessing the operating the duty controller in the steady state includes sequentially decreasing the number of D flip-flops from a maximum number or sequentially increasing the number of D flip-flops from a minimum number.

* * * * *